(12) United States Patent
Azemi et al.

(10) Patent No.: US 12,282,596 B2
(45) Date of Patent: Apr. 22, 2025

(54) EYE DETECTION METHODS AND DEVICES

(71) Applicant: Apple Inc., Cupertino, CA (US)

(72) Inventors: Erdrin Azemi, San Mateo, CA (US);
Ali Moin, San Mateo, CA (US);
Christoph H. Krah, Cupertino, CA (US); Joseph Yitan Cheng, Cupertino, CA (US); Kaan Emre Dogrusoz, San Francisco, CA (US); Mohammad Yeke Yazdandoost, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/403,599

(22) Filed: Jan. 3, 2024

(65) Prior Publication Data
US 2024/0134449 A1 Apr. 25, 2024

Related U.S. Application Data

(62) Division of application No. 17/448,873, filed on Sep. 24, 2021, now Pat. No. 11,874,958.

(51) Int. Cl.
*G06F 3/01* (2006.01)
*G06F 1/3203* (2019.01)
(Continued)

(52) U.S. Cl.
CPC ............ *G06F 3/013* (2013.01); *G06F 1/3203* (2013.01); *G06F 1/325* (2013.01); *G06F 3/015* (2013.01);
(Continued)

(58) Field of Classification Search
CPC .......... G06F 3/013; G06F 3/015; G06F 3/017; G06F 1/3203; G06F 1/325; G06F 1/3206; G06F 1/3234; G06F 1/3287
See application file for complete search history.

(56) References Cited

U.S. PATENT DOCUMENTS 7,123,215 B2 10/2006 Nakada
7,463,926 B1 12/2008 Levine et al.
(Continued)

FOREIGN PATENT DOCUMENTS

KR   10-2021-0016790 A   2/2021

OTHER PUBLICATIONS

Final Office Action received for U.S. Appl. No. 17/448,873, mailed on Jul. 28, 2023, 14 pages.
(Continued)

*Primary Examiner* — Mihir K Rayan
(74) *Attorney, Agent, or Firm* — Kubota & Basol LLP

(57) ABSTRACT

A head-mounted device having a plurality of electrodes configured to detect optical events such as the movement of one or more eyes or coarse eye gestures is disclosed. In some examples, the one or more electrodes can be coupled to dielectric elastomer materials whose shape can be changed to vary contact between a user of the head-mounted device and the one or more electrodes to ensure sufficient contact and electrode signal quality. In some examples, the one or more electrodes can be coupled to pressure sensors and control circuitry to monitor and adjust the applied pressure. In some examples, the optical events can be used as triggers for operating the device, including transitioning between operational power modes. In some examples, the triggers can invoke higher resolution sensing capabilities of the head-mounted device. In some examples, the electrodes can be used as an on-head detector to wake-up and/or unlock the device.

20 Claims, 8 Drawing Sheets

(51) Int. Cl.
  *G06F 1/3234* (2019.01)
  *G06F 1/3206* (2019.01)
  *G06F 1/3287* (2019.01)
(52) U.S. Cl.
  CPC ............ *G06F 3/017* (2013.01); *G06F 1/3206* (2013.01); *G06F 1/3234* (2013.01); *G06F 1/3287* (2013.01)

(56) References Cited

U.S. PATENT DOCUMENTS

| | | | |
|---|---|---|---|
| 9,579,060 | B1 | 2/2017 | Lisy et al. |
| 9,664,902 | B1 | 5/2017 | Raffle et al. |
| 10,314,534 | B2* | 6/2019 | Yoon ..................... G16H 20/30 |
| 10,353,464 | B2 | 7/2019 | Skogö et al. |
| 11,331,045 | B1 | 5/2022 | Moschella et al. |
| 2003/0171661 | A1* | 9/2003 | Tong ....................... A61B 5/721 600/300 |
| 2008/0188777 | A1 | 8/2008 | Bedziouk et al. |
| 2009/0292223 | A1 | 11/2009 | Sugio et al. |
| 2011/0170067 | A1 | 7/2011 | Sato et al. |
| 2014/0300532 | A1 | 10/2014 | Karkkainen et al. |
| 2014/0303459 | A1 | 10/2014 | Wada et al. |
| 2015/0112153 | A1 | 4/2015 | Nahum |
| 2015/0301594 | A1* | 10/2015 | Kitazawa ............... A61B 5/389 345/156 |
| 2015/0335288 | A1 | 11/2015 | Toth et al. |
| 2016/0206239 | A1 | 7/2016 | Yoon et al. |
| 2017/0060252 | A1* | 3/2017 | Komaki ................ G06F 3/0485 |
| 2017/0150897 | A1 | 6/2017 | Komaki |
| 2017/0188947 | A1 | 7/2017 | Connor |
| 2017/0209053 | A1 | 7/2017 | Pantelopoulos et al. |
| 2017/0285735 | A1 | 10/2017 | Young et al. |
| 2018/0184002 | A1 | 6/2018 | Thukral et al. |
| 2018/0348863 | A1 | 12/2018 | Aimone et al. |
| 2019/0151193 | A1* | 5/2019 | Van Den Ende ...... A61H 39/04 |
| 2019/0312193 | A1* | 10/2019 | Pelssers ............... H10N 30/092 |
| 2019/0369726 | A1 | 12/2019 | Kang et al. |
| 2020/0019238 | A1 | 1/2020 | Agaoglu et al. |
| 2020/0408615 | A1* | 12/2020 | Scott ......................... G01L 1/02 |
| 2021/0081040 | A1 | 3/2021 | Sengelaub |
| 2021/0089119 | A1 | 3/2021 | Riguer et al. |
| 2022/0124242 | A1 | 4/2022 | Gruhlke et al. |
| 2022/0409137 | A1* | 12/2022 | Powell .................. A61B 5/296 |
| 2023/0102507 | A1 | 3/2023 | Azemi et al. |

OTHER PUBLICATIONS

Non-Final Office Action received for U.S. Appl. No. 17/448,873, mailed on Feb. 1, 2023, 12 pages.
Notice of Allowance received for U.S. Appl. No. 17/448,873, mailed on Sep. 11, 2023, 8 pages.
Restriction Election Requirement received for U.S. Appl. No. 17/448,873 mailed on Jul. 26, 2022, 6 pages.
Amrutha et al., "A Review on Noises in EMG Signal and its Removal", International Journal of Scientific and Research Publications, vol. 7, Issue 5, Available online at: <https://www.ijsrp.org/research-paper-0517.php?rp=P656368>, May 2017, pp. 23-27.
Coxworth, Ben, "Multi-Function E-Glasses Track the Brain, Eyes and More", New Atlas, Available online: <https://newatlas.com/wearables/multi-function-e-glasses/>, [Retrieved Oct. 21, 2022], May 27, 2020, pp. 1-10.
Kosmyna et al., "AttentivU: A Wearable Pair of EEG and EOG Glasses for Real-Time Physiological Processing", 2019 IEEE 16th International Conference on Wearable and Implantable Body Sensor Networks (BSN), Available online at: <https://ieeexplore.ieee.org/document/8771080>, May 19-22, 2019, 4 pages.
Vallat, Raphael, "Compute the Average Bandpower of an EEG Signal", Postdoctoral Researcher, Walker Lab, UC Berkeley, Available online: <https://raphaelvallat.com/bandpower.html>, [Retrieved Oct. 21, 2022], May 2018, 16 pages.
Zhao et al., "Review of Dielectric Elastomers for Actuators, Generators and Sensors", IET Nanodielectrics, vol. 3, Issue 4, Available online at: <https://ietresearch.onlinelibrary.wiley.com/doi/10.1049/iet-nde.2019.0045>, Sep. 3, 2020, pp. 99-106.
Search Report received for Chinese Patent Application No. 202211163306.X, mailed on Aug. 29, 2024, 4 pages (2 pages of English Translation and 2 pages of Official Copy).

* cited by examiner

EYE DETECTION METHODS AND DEVICES

CROSS-REFERENCE TO RELATED APPLICATIONS

This application is a division of U.S. patent application Ser. No. 17/448,873, filed Sep. 24, 2021, the content of which is herein incorporated by reference in its entirety for all purposes.

FIELD OF THE DISCLOSURE

This relates generally to methods and devices configured for the detection of eye movement.

BACKGROUND OF THE DISCLOSURE

Some devices provide eye tracking systems to enable human-computer interaction. In some uses, a device can capture the eye movement of a user, using the movement as an intuitive input for operating and invoking features of the device, allowing faster and more efficient interaction. Devices that decrease friction of interactions between a user and device are desirable.

SUMMARY OF THE DISCLOSURE

Some examples of the disclosure are directed to a head-mounted device having a plurality of electrodes configured to detect optical events such as the movement of one or more eyes or coarse eye gestures. In some examples, the one or more electrodes can be coupled to dielectric elastomer materials whose shape can be changed to vary contact between a user of the head-mounted device and the one or more electrodes to ensure sufficient contact and electrode signal quality. In some examples, the one or more electrodes can be coupled to pressure sensors and control circuitry to monitor and adjust the applied pressure. In some examples, the optical events can be used as triggers for operating the device, including transitioning between operational power modes. In some examples, the triggers can invoke higher resolution sensing capabilities of the head-mounted device. In some examples, the electrodes can be used as an on-head detector to wake-up and/or unlock the device.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

As computer input technology continues to develop, various advances in input devices have allowed users to interact with computational systems more efficiently. Head-mounted devices including elements configured to detect movement of eyes are one example of an innovation that can further improve the speed, efficiency, and ease with which users can interact with one or more computational systems. In some embodiments, the gaze of a user can be detected to seamlessly invoke functions of the device. For example, while a user's hands are otherwise occupied, one or more ocular events (e.g., eye blinks, eye focus, and/or the movement of (eye) gaze) can be monitored to wake-up and/or unlock the device. Gaze estimation can also be used for eye gesture recognition and to provide inputs to various user interfaces, such as to select or switch between settings, and to provide input shortcuts. Additionally or alternatively, focus and/or movement of gaze can serve as a trigger to transition the device and/or systems from a lower power operating mode to a higher power operating mode to reduce computational complexity and prolong battery life of the device. As referred to herein, an ocular event can comprise one or more blinks, fixations and/or saccades of the eyes. It is further understood that ocular events can comprise a sequence of one or more ocular events (e.g., a sequence of one or more blinks, fixations, and/or saccades in some combination). Other use cases for the detection of ocular events includes on head device recognition (e.g., sense that the device is being worn on a user's head and turn on the device), accessibility for the disabled, and eye health.

In some embodiments, a head-mounted device can comprise electrodes configured to monitor electrical impulses corresponding to an ocular event. For example, electrodes coupled to dielectric elastomer (DE) materials can be arranged around features of the body including, but not limited to, in contact with and/or above the nose, behind and/or around the ears, the temples, and/or any other location suitable for detecting and capturing the electrical impulses associated with one or more ocular events or other brain related events and neural activities.

Figure 1:
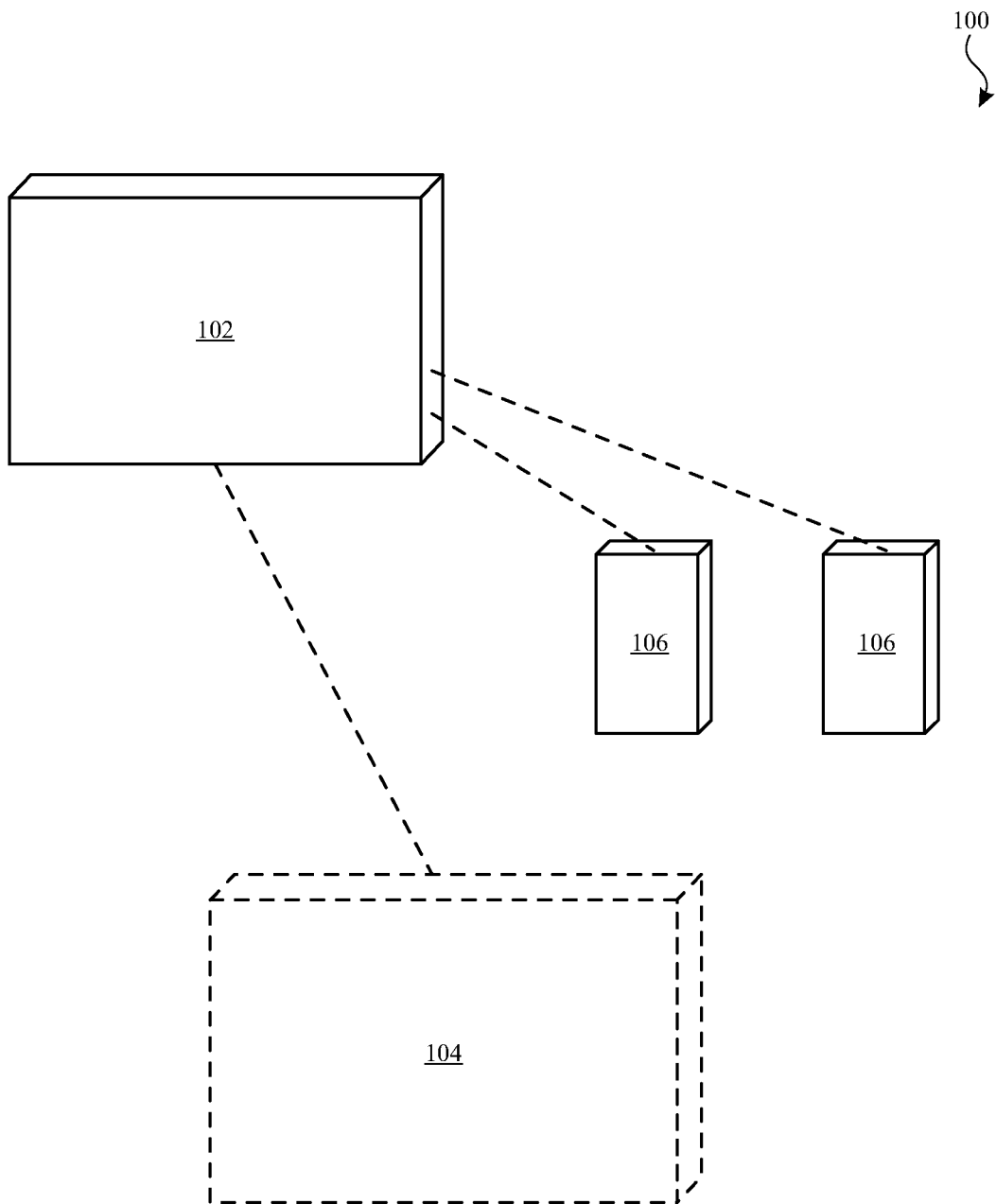
FIG. 1 illustrates a symbolic hardware diagram of a system for detecting ocular events according to some embodiments of the disclosure.

FIG. 1 illustrates a symbolic hardware diagram of system 100 for detecting ocular events according to some embodiments of the disclosure. In some embodiments, system 100 can include a portable device 102, which can be a wearable device such as glasses, goggles, a visor, a mask, a helmet, or other head-mounted device. In some embodiments, device 102 can be communicatively coupled to device 104, which can be a smart phone, a tablet computer, a laptop computer, an auxiliary device in communication with another device, a wearable host device, etc. In some embodiments, device 102 can additionally or alternatively be communicatively coupled to one or more devices 106, which can be accessory devices such as a wand, handheld touch controllers, gloves, etc. In some embodiments, system 100 can comprise only a single device 102 (and optional accessory devices 106), with the functionality of device 104 included in device 102.

In some embodiments, a plurality of electrodes and associated circuitry (not shown) can be located on or within device 102 such that when the device is worn on a user's head, the electrodes make contact with selected areas of the user's head around the eyes, nose, temples and/or ears. Voltage differences between the electrodes can be measured to detect electrical impulses associated with one or more ocular events, such as the movement of a user's gaze (the location at which the user's eyes are focused). When the user's gaze is correlated to a specific area or object within a computer-generated environment or the physical environment, or correlated to a specific user interface affordance within the computer-generated environment, particular operations can be initiated. In various embodiments, the computer-generated environment can be presented on a display or surface within device 102 (e.g., on glasses or a head-mounted device) or device 104 (e.g., on a display of a computing device).

Figure 2:
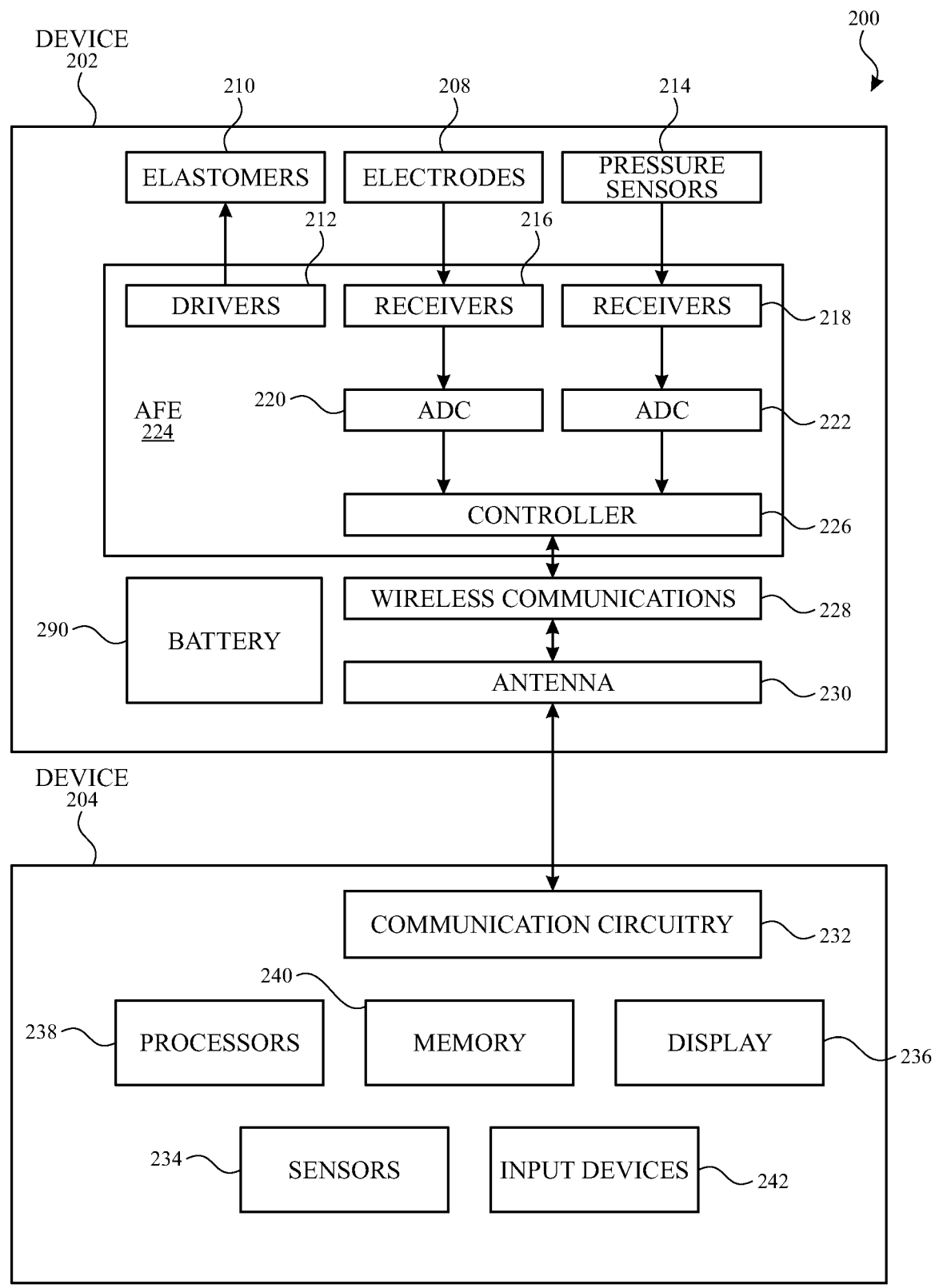
FIG. 2 illustrates a functional block diagram of a system for detecting ocular events according to some embodiments of the disclosure.

FIG. 2 illustrates a functional block diagram of system 200 for detecting ocular events according to some embodiments of the disclosure. In some embodiments, system 200 can be at least partially incorporated into a portable device 202, which can be wearable device such as glasses, goggles, a visor, a mask, a helmet, or other head-mounted device. A plurality of electrodes 208 can be located on device 202 for detecting electrical impulses associated with one or more ocular events. These electrical impulses can be detected by measuring voltage differences between electrodes using receivers 216, and can be converted to digital signals via analog-to-digital converter (ADC) 220. In some embodiments, a plurality of elastomers 210 can be attached to electrodes 208 to assist the electrodes in making better contact with the skin of a user. In one example, drivers 212 can apply stimulation voltages (e.g., a DC, AC, and/or some combination thereof) to elastomers 210, which can cause the elastomers to deform in response to applied electric fields and cause electrodes 208 to apply increased pressure to the skin of the user. In some embodiments, pressure sensors 214 can be employed in the vicinity of electrodes 208 to detect the pressure being applied to the skin of the user. Electrical signals from pressure sensors 214 can be received by receivers 218 and converted to digital signals via ADC 222. Controller 226 can be coupled to the one or more ADCs 220 and 222 to receive and/or process the digitized signals from electrodes 208 and pressure sensors 214. Pressure information received from pressure sensors 214 can be processed by controller 226 to determine updated voltages to be applied by drivers 212. In this manner, a feedback loop can be created to maintain proper pressure of electrodes 208 against the user.

In some embodiments, drivers 212, receivers 216 and 218, ADCs 220 and 222, and controller 226 can constitute an analog front end (AFE) 224 for elastomers 210, electrodes 208 and pressure sensors 214, and can be incorporated partially or entirely into a single package (e.g., within an integrated circuit and/or system-on-chip). However, the embodiments described with respect to the front-end circuitry are merely exemplary and not limiting in any way. For example, the above-described components do not necessarily require a single package. In some embodiments, controller 226 can be coupled to one or more wireless communication modules 228 (e.g., a Bluetooth Low Energy radio module, Zigbee module) configured to facilitate transmission and/or reception of signals. Communication modules 228 can be additionally coupled to one or more antennas 230 and one or more power sources such as battery 290. In some embodiments, the above-described components can be incorporated partially or entirely into a single package (e.g., within an integrated circuit and/or system-on-chip).

In some embodiments, device 202 can be communicatively coupled to device 204, which can be a smart phone, a tablet computer, a laptop computer, an auxiliary device in communication with another device, a wearable host device, etc. that is separate from device 202. However, in other embodiments, the functionality of device 204 as shown in FIG. 2 can be included in a single device 202. Communication circuitry 232 in device 204 can optionally include circuitry for communicating with electronic devices such as device 202, networks such as the Internet, intranets, a wired network and/or a wireless network, cellular networks and wireless local area networks (LANs). Communication circuitry 232 can also optionally include circuitry for communicating using near-field communication (NFC) and/or short-range communication, such as Bluetooth®.

Device 204 can optionally include various sensors 234 (e.g., hand tracking sensors, location sensors, image sensors, touch-sensitive surfaces, motion and/or orientation sensors, eye tracking sensors, microphones or other audio sensors, etc.), one or more display generation components such as display 236, one or more processors 238, one or more memories 240, input devices 242, and other components. One or more communication buses not shown in FIG. 2 can optionally be used for communication between the above mentioned components within device 204.

Processors 238 can optionally include one or more general purpose processors, one or more graphics processors, and/or one or more digital signal processors (DSPs). In some embodiments, memory 240 can be a non-transitory computer-readable storage medium (e.g., flash memory, random access memory, or other volatile or non-volatile memory or storage) that stores computer-readable instructions configured to be executed by processors 238 to perform the techniques, processes, and/or methods described herein. In some embodiments, memory 240 can include a non-transitory computer-readable storage medium. A non-transitory computer-readable storage medium can be any medium (e.g., excluding a signal) that can tangibly contain or store computer-executable instructions for use by or in connection with the instruction execution system, apparatus, or device. The non-transitory computer-readable storage medium can include, but is not limited to, magnetic, optical, and/or semiconductor storage. Examples of such storage include magnetic disks, optical discs based on CD, DVD, or Blu-ray technologies, as well as persistent solid-state memory such as flash, solid-state drives, and the like.

Display 236 can optionally include a single display (e.g., a liquid-crystal display (LCD), organic light-emitting diode (OLED), or other types of display). In some embodiments, display 236 can include multiple displays. In some embodiments, display 236 can include a display with a touch-sensitive surface (e.g., a touch screen), a projector, a holographic projector, a retinal projector, etc.

In some embodiments, sensors 234 can include a touch-sensitive surface configured to receive user inputs (touch and/or proximity inputs), such as tap inputs and swipe inputs or other gestures. In some embodiments, display 236 and the touch-sensitive surface together can form a touch-sensitive display (e.g., a touch screen integrated with device 204 or external to device 204 that is in communication with device 204). Device 204 can also optionally include and receive input from one or more input devices 242 other than a touch-sensitive surface, such as a physical keyboard, a mouse, a stylus and/or a joystick (or any other suitable input device).

Sensors 234 can also include image sensors, which can optionally include one or more visible light image sensors, such as charged coupled device (CCD) sensors, and/or complementary metal-oxide-semiconductor (CMOS) sensors operable to obtain images of physical objects from the real-world environment. The image sensors can optionally include one or more infrared (IR) or near infrared (NIR) sensors, such as a passive or an active IR or NIR sensor, for detecting infrared or near infrared light from the real-world environment. For example, an active IR sensor can include an IR emitter for emitting infrared light into the real-world environment. The image sensors can optionally include one or more cameras configured to capture movement of physical objects in the real-world environment. The image sensors can optionally include one or more depth sensors configured to detect the distance of physical objects from device 204. In some embodiments, information from one or more depth sensors can allow the device to identify and differentiate objects in the real-world environment from other objects in the real-world environment. In some embodiments, one or more depth sensors can allow the device to determine the texture and/or topography of objects in the real-world environment.

In some embodiments, device 204 can use CCD sensors, event cameras, and depth sensors in combination to detect the physical environment around the device. In some embodiments, image sensors can include a first image sensor and a second image sensor. The first image sensor and the second image sensor can work together and optionally can be configured to capture different information of physical objects in the real-world environment. In some embodiments, the first image sensor can be a visible light image sensor and the second image sensor can be a depth sensor. In some embodiments, device 204 can use image sensors to detect the position and orientation of device 204 and/or display 236 in the real-world environment. For example, device 204 can use image sensors to track the position and orientation of display 236 relative to one or more fixed objects in the real-world environment. In some embodiments, sensors such as cameras (e.g., image sensors) can be used to capture images of the real-world environment. The images can be processed by processing circuitry (one or more of processor(s) 238) to localize and measure light sources. In some embodiments, light can be determined from the reflections and or shadows cast by light sources in the environment. In some embodiments, deep learning (e.g., supervised) or other artificial intelligence or machine learning is used to estimate the lighting characteristic based on input image(s).

In some embodiments, sensors 234 can optionally include hand tracking sensors and/or eye tracking sensors. Hand tracking sensors can be configured to track the position/location of a user's hands and/or fingers, and/or motions of the user's hands and/or fingers with respect to the computer-generated environment, relative to display 236, and/or relative to another coordinate system. The eye tracking sensors (different from electrodes 208 that can also be used for eye tracking) can be configured to track the position and movement of a user's gaze (eyes, face, or head, more generally) with respect to the real-world or computer-generated environment and/or relative to display 236. The user's gaze can include a direction in which the eyes are directed, and optionally intersection with a particular point or region of space and/or intersection with a particular object. In some embodiments, the hand tracking sensors and/or the eye tracking sensors can be implemented together with display 236 (e.g., in the same device). In some embodiments, the hand tracking sensors and/or the eye tracking sensors can be implemented separate from display 236 (e.g., in a different device).

In some embodiments, the hand tracking sensors can use image sensors (e.g., one or more IR cameras, 3D cameras, depth cameras, etc.) that capture three-dimensional information from the real-world including one or more hands. In some examples, the hands can be resolved with sufficient resolution to distinguish fingers and their respective positions. In some embodiments, one or more image sensors can be positioned relative to the user to define a field of view of the image sensors and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures) can be advantageous in that it provides an input means that does not require the user to touch or hold input device, and using image sensors allows for tracking without requiring the user to wear a beacon or sensor, etc. on the hands/fingers.

In some embodiments, the eye tracking sensors can include one or more eye tracking cameras (e.g., IR cameras) and/or illumination sources (e.g., IR light sources/LEDs) that emit light towards a user's eyes. Eye tracking cameras may be pointed towards a user's eyes to receive reflected light from the light sources directly or indirectly from the eyes. In some embodiments, both eyes are tracked separately by respective eye tracking cameras and illumination sources, and gaze can be determined from tracking both eyes. In some embodiments, one eye (e.g., a dominant eye) is tracked by a respective eye tracking camera/illumination source.

Device 204 can optionally include microphones or other audio sensors. Device 204 can use microphones to detect sound from the user and/or the real-world environment of the user. In some embodiments, the microphones can include an array of microphones that optionally operate together (e.g., to identify ambient noise or to locate the source of sound in space of the real-world environment). In some embodiments, audio and/or voice inputs can be used to interact with the user interface or computer-generated environment captured using one or more audio sensors (e.g., microphones), as permitted by the user of the electronic device.

Device 204 can optionally include location sensors configured to detect a location of device 204 and/or display 236. For example, location sensors can optionally include a GPS receiver that receives data from one or more satellites and allows device 204 to determine the device's absolute position in the physical world. Device 204 can also optionally include motion and/or orientation sensors configured to detect orientation and/or movement of device 204 and/or display 236. For example, device 204 can use orientation sensors to track changes in the position and/or orientation of device 204 and/or display 236 (e.g., with respect to physical objects in the real-world environment). Orientation sensors can optionally include one or more gyroscopes, one or more accelerometers, and/or one or more inertial measurement units (IMUs).

Device 204 or system 200 can support a variety of applications that may be displayed in the computer-generated environment, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo/video management application, a digital camera application, a digital video camera application, a web browsing application, a digital music player application, a television channel browsing application, and/or a digital video player application.

A computer-generated environment may be displayed using one or both of devices 202 and 204, including using one or more display generation components. The computer-generated environment can optionally include various graphical user interfaces ("GUIs") and/or user interface objects. As described herein, a computer-generated environment including various GUIs may be displayed using device 202 or device 204, including one or more display generation components. The computer-generated environment can include one or more GUIs associated with an application. For example, a computer-generated environment can display a menu or selectable options to cause launching or display of user interfaces for applications in the computer-generated environment. Similarly, the computer-generated environment can display a menu or selectable options to perform operations with respect to applications that are running in the computer-generated environment.

It is understood that the architecture of FIG. 2 is an example architecture, but that device 202 and device 204 are not limited to the components and configuration of FIG. 2. For example, device 202 and 204 can include fewer, additional, or other components in the same or different configurations.

Figure 3:
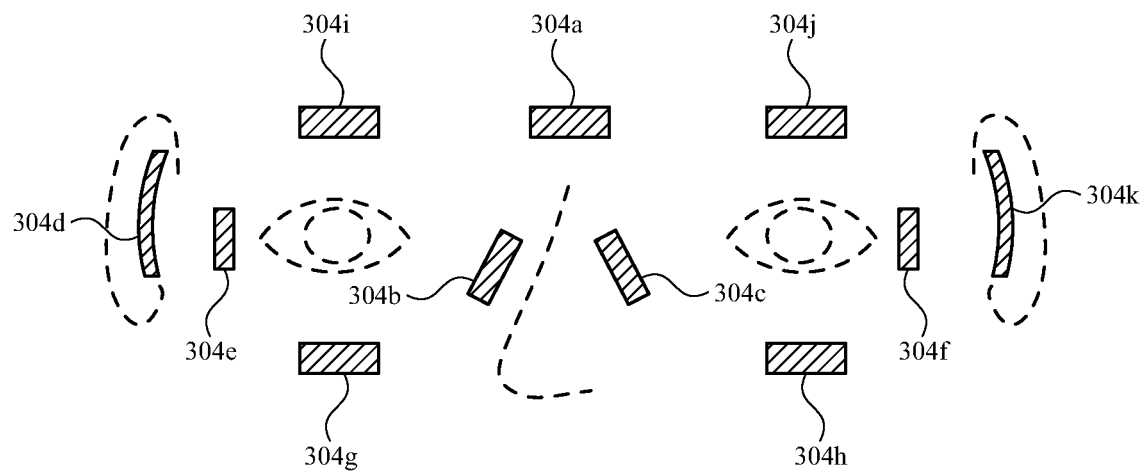
FIG. 3 illustrates a plurality of electrodes at locations around the face and head of a user for detecting ocular events according to examples of the disclosure.

FIG. 3 illustrates a plurality of electrodes 304 at locations around the face and head of a user for detecting ocular events according to examples of the disclosure. Although not shown in FIG. 3, electrodes 304 can be formed in, coupled to, or otherwise disposed on structures such as glasses in one representative example, and can be formed in, coupled to, or otherwise disposed on the housing of different types of head-mounted devices, such as a pair of goggles, glasses, a mask, a helmet, or a visor in other examples. In various examples, the structures or devices can have a form factor allowing the structure or device to rest partially or entirely on the face of a user. In some examples, the structure or device can comprise one or more transparent, or mostly transparent lenses 306. In some examples, the lenses 306 can be formed from suitable materials selected to optimize durability, visibility, reduce glare, and/or to project or display images/video (e.g., to display a user interface and corresponding elements). In some embodiments, one or more materials can be disposed in part or entirely over the surface of one or more faces of lenses 306 to achieve the aforementioned optical and/or mechanical qualities.

In some embodiments, electrodes 304 can act as sensors configured to capture physiological signals associated with one or more ocular events. The use of electrodes 304 can provide a lower cost implementation for performing eye tracking as compared to camera-based systems, for example. Electrodes 304 can have a linear, or nearly linear relationship between a visual angle of an eye and the amplitude of an output signal. By arranging a plurality of electrodes in different positions around the eye, electrodes 304 can extract information about the direction, movement, and/or fixation of the eye for further processing. In some embodiments, the electrodes can be configured as electrooculography (EOG) sensors to provide measures of electrical activity of the eyes. Specifically, EOG sensors can detect voltage differences between the cornea and the retina of an eye and capture EOG signals. For example, EOG sensors can be configured to provide indications of the dipole formed between a cornea and a retina of an eye. Additionally or alternatively, electrodes can be configured as electroencephalography (EEG) sensors that capture EEG signals and provide measures of electrical activity of the brain of a user. Additionally or alternatively, electrodes can be configured as electromyography (EMG) sensors that capture EMG signals and provide measures of electrical activity of muscle and/or tissue associated with the eye. All of these types of sensors can be used to capture and interpret the intent of a wearer of device 300.

Embodiments comprising sensors configured to detect EOG signals (e.g., referred to as EOG sensors) are primarily described herein; however, it is noted that such description is merely exemplary and not limiting in any way. For example, EEG signals, EMG signals, some combination thereof, and/or any suitable physiological electrical signal(s) associated with one or more ocular events can be used in conjunction with and/or in place of one or more EOG sensors where appropriate. Similarly, embodiments describing EEG and/or EMG sensors can be supplemented with and/or replaced by EOG sensors where appropriate.

In some embodiments, electrodes 304 can be placed within or on the surface of a structure or the housing of a device, or in some combination thereof. For example, electrodes 304 can be placed such that when the structure or device is worn, substantial contact is made between the electrodes and one or more portions of the user's head, preferably with exposed skin. In various examples, electrode 304a can be configured to make contact with the forehead of the user, electrodes 304b and 304c can be configured to make contact with opposing sides of the nose bridge of a user, electrodes 304d and 304k can be configured to make contact with and/or around the ears, electrodes 304e and 304f can be configured to make contact around the temples of the user, electrodes 304g and 304h can be configured to make contact around the cheeks of the user, and electrodes 304i and 304j can be configured to make contact around the eyebrows of the user.

In some embodiments, electrodes 304 can be greater and/or fewer in number than shown. For example, device 300 can comprise two electrodes which, when sensed, provide indications of one or more ocular events to the device. Additionally or alternatively, a greater number of electrodes than shown in FIG. 3 can be introduced to provide additional information about eye movement.

It is understood that the disclosure herein regarding the location, form, and function of electrodes is not limiting in any way. In some embodiments, the electrodes can be arranged in different positions, faces of the structure or housing, and assume any appropriate shape and/or size as desired. For example, the location of electrodes can be selected based on the relative distance between a respective electrode one or more (e.g., reference) electrodes. In some embodiments, a reference electrode can be arranged at a sufficient distance from one or more other electrodes (e.g., measured electrodes), in order to increase the magnitude of differential signals between the reference and the one or more electrodes. This can include electrode 304-a, which can provide a reference that is symmetrical with respect to additional electrodes (e.g., electrode 304b and electrode 304c can be arranged on opposing faces of a nose bridge, thus being arranged symmetrically with respect to electrode 304a for EOG sensing configurations). Additionally or alternatively, one or more reference electrodes can be selected dynamically while operating device 300 to configure appropriate optical event sensing modalities (e.g., EOG, EMG, and/or EEG). Additionally or alternatively, electrode 304d and/or electrode 304k (e.g., for EEG sensing) can be configured as reference electrodes, such that the reference electrode(s) are located sufficiently far from additional measured electrodes (e.g., electrode 304b and 304c) to increase the magnitude of a differential signal between a reference and any one of electrodes 304. For example, a first reference electrode can be connected to a first input of a differential amplifier while a measurement electrode is connected to a second input of the differential amplifier. At the same time, a second reference electrode can be connected to a stimulation signal. The stimulus can be selected to mitigate the effect of unwanted common-mode noise that appears on the differential signal between the first reference electrode and the measured electrode due to the mismatch in both internal and external components in the signal path. Additionally or alternatively, the stimulus can be selected to otherwise mitigate the effect of unwanted noise on sensing and operation of the device. In some embodiments, driving the second reference electrode (e.g., with a driven right leg technique) can improve the rejection of common-mode noise. For example, environmental noise at 60 Hz can be sensed by device 300, and a controller included in device 300 can comprise circuitry configured to drive the second reference electrode with a stimulus associated with reducing the 60 Hz noise. In some embodiments, the reference electrode can be configured to eliminate one or more signals (broadband noise, narrowband signals, etc.). It is understood that any electrode can be configured to act as a reference electrode. For example, in some embodiments a multiplexer can receive inputs from some or all of the electrodes, and programmably select any one of the received inputs as the reference electrode. In some embodiments, the reference electrode can alternate between different electrode locations, and a set of electrode measurements can be obtained each time the reference electrode is changed to a different location. These multiple sets of electrode measurements can be used in combination, or separately, to optimize signal quality and accuracy, and to obtain data for eye gaze determination.

In some embodiments, electrodes 304 can be "dry" electrodes (e.g., with no conductive gel) that provide a discreet, low cost, and practical solution for sensing EOG signals. Conventional wet electrodes utilize one or more materials configured to improve detection of physiological signals; however, the materials (e.g., electrolytic gels) can be uncomfortable and unsuitable outside of clinical applications, and can be more expensive than dry electrodes. Accordingly, when implemented in some devices, electrodes 304 can be formed from one material or a combination of suitable materials to ensure portability, reusability, cleanliness, and comfort while reducing costs. In some embodiments, electrodes 304 can be formed of one or more suitable conductive materials such as steel, copper, carbon, aluminum, copper, gold, silver, tin, pewter, and/or titanium. The electrodes can also comprise a coating (e.g., foam, powder, film, etc.) disposed on one or more surfaces of the electrodes. The materials associated with the electrodes can be selected appropriately to optimize signal quality and impedance between the skin and the electrodes.

When sensing EOG signals or other physiological signals, sufficient contact between electrodes and the tissue (e.g., the epidermis) of a user can be crucial to improve signal quality and integrity, and to obtain a predictable impedance presented to drive and/or sensing circuitry of a device. However, contact requirements can present difficulties when designing a device that is adaptable to variances in physical and physiological features of a user and movement introduced by the user (e.g., a user shifting the device intentionally or inadvertently). The human head, for example, can provide a highly variable contact surface including contours and variable surface conditions (including hair, oil, scar tissue, sweat, etc.). Furthermore, the head of a user is frequently in motion and can cause a device to move, potentially affecting electrode contact integrity. Consequently, wearable device solutions—especially for eye gaze and/or detection applications—stand to benefit by including a mechanism to apply variable pressure between electrodes and human tissue.

Therefore, in some embodiments, electrodes can be coupled to elements that are configured to improve contact between the electrodes and user tissues. In some embodiments, these elements can apply pressure to an electrode to press, pull, and/or deform the electrode to provide a contact force on one or more surfaces of the electrode before, during, and/or after electrical measurements. Applied force can better mechanically and electrically couple user tissues (e.g., the epidermis) and electrodes, thus optimizing electrical measurements. In some embodiments, the contact force can be applied via a mechanical element.

Figure 4:
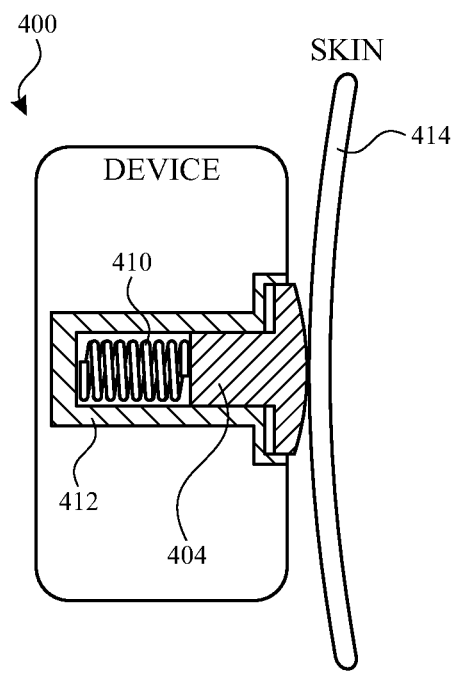
FIG. 4 illustrates an example electrode configuration comprising a pogo pin element to improve coupling between the electrode and tissue according to examples of the disclosure.

FIG. 4 illustrates an example electrode configuration comprising a pogo pin element to improve coupling between the electrode and tissue according to examples of the disclosure. In some embodiments, device 400 can be configured to measure one or more EOG signals. As described above, it can be advantageous to provide consistent contact between an electrode 404 and tissue 414 such that device 400 can reliably obtain measurements of electrical impulses associated with a user of the device, for example, by providing a stimulus and/or measuring a signal via the electrode. In some embodiments, the device can comprise one or more elements, such as pogo pin 410, which can be coupled to the electrode to improve contact between one or more surfaces of the electrode and the tissue. In some embodiments, pogo pin 410 and/or electrode 404 can be retained within a housing 412 within the device and spring-biased with respect to the housing. In some embodiments, the tissue 414 can correspond to the skin (e.g., epidermis) of a user of the electrodes. In some embodiments, electrode 404 can be mounted partially or entirely on the surface of the device. As the tissue is brought in contact with the electrode, the pogo pin can be compressed, thus applying force on the electrode towards the tissue, and improving the quality of mechanical and/or electrical contact.

Figure 5A:
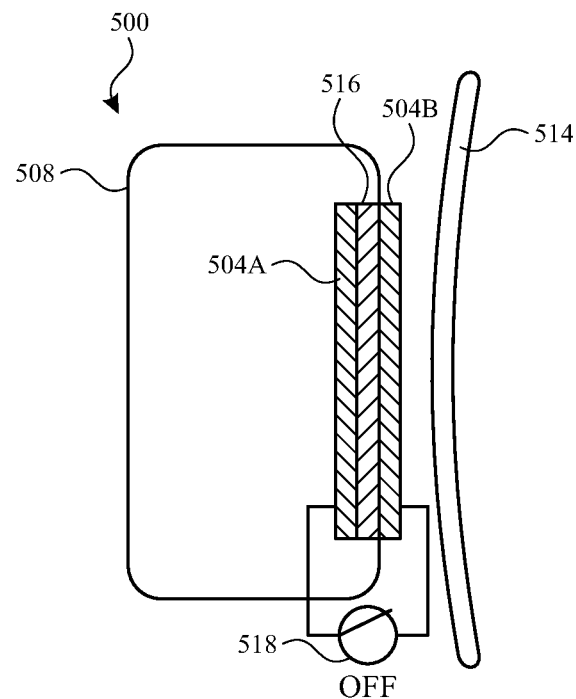
FIG. 5A illustrates an example electrode configuration including one or more elements in an inactive state, but which can be activated to improve coupling between the electrodes and tissue according to examples of the disclosure.

FIG. 5A illustrates an example electrode configuration including one or more elements in an inactive state, but which can be activated to improve coupling between the electrodes 504 and tissue 514 according to examples of the disclosure. FIG. 5A illustrates an exemplary device 500 comprising a housing 508, two electrodes 504A and 504B formed in or on the device housing (although other electrodes can also be present in or on the device), and one or more elastomer (elastic polymer) materials 516 (e.g., a dielectric elastomer material). In some examples, elastomer 516 can be sandwiched between electrodes 504A and 504B. In some examples, device 500 can include circuitry 518 to drive electrodes 504A and 504B. Driving the electrodes 504 can change the shape of the elastomer 516 and cause the electrodes to conform and make contact with tissue 514 (e.g., epidermis) of a user. Although not shown in FIG. 5A, electrodes 504 and elastomer 516 can also be arranged in other suitable configurations. For example, the electrodes 504A and 504B can be arranged some distance apart within the same plane, or nearly the same plane. Elastomer 516 can be arranged in a different plane from the electrodes such that an electric field (e.g., caused by different voltages applied to electrodes 504A and 504B) can alter the shape of the elastomer, in some instances even when portions of the surfaces of the elastomer are uncoupled with respect to portions of the electrodes. In some embodiments, elastomer 516 can be formed from an electroactive material including, but not limited to, dielectric elastomers. Dielectric elastomers can provide a compressive stress in response to an applied electrical field, and can provide numerous benefits in an EOG sensing system, especially when incorporated into designs requiring rugged, lightweight, and comfortable solutions. Dielectric elastomers can exhibit high flexibility/deformation in the presence of an applied electric field, but can return to an initial form in the absence or reduction of the electric field. Dielectric elastomers can include acrylics, silicones, polyurethanes, fluroelastomers, ethylene-propylene rubbers, and/or any other suitable material that can undergo large and reversible deformation in response to electric fields. Dielectric elastomers, as referred to herein, will be used to describe a family of suitable electroactive materials; however, it is understood that such descriptions and embodiments herein are merely exemplary and not limiting in any way.

Figure 5B:
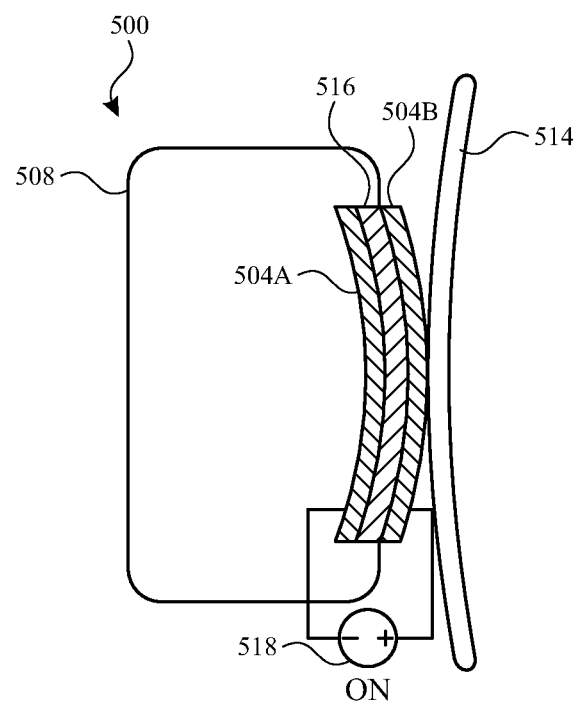
FIG. 5B illustrates the example electrode configuration of FIG. 5A including one or more elements in an activated state to improve coupling between the electrodes and tissue according to examples of the disclosure.

FIG. 5B illustrates the example electrode configuration of FIG. 5A including one or more elements in an activated state to improve coupling between the electrodes 504 and tissue 514 according to examples of the disclosure. In FIG. 5B, circuitry 518 (e.g., a source) applies a voltage or current across a first electrode 504A and a second electrode 504B. In response to the application of voltage and/or current, an electric field is created between first electrode 504A and second electrode 504B. In response to this applied electric field, the resulting electrostatic pressure and mechanical compression causes the elastomer 516 located between the first electrode 504A and the second electrode 504B to undergo a deformation (as compared to FIG. 5A, which is prior to deformation), where the elastomer contracts in thickness and expands in area. Because the first electrode 504A and the second electrode 504B are coupled to elastomer 516, the increase in surface area of the elastomer causes the electrodes to warp or "buckle" and protrude from device housing 508, resulting in increased force or pressure being applied by the electrodes against tissue 514. In some embodiments, elastomer 516 is configured as a planar, or nearly planar film that can protrude outside the dimensions of a plane parallel to the film. In some embodiments, elastomer 516 can be implemented as a plurality of layers of dielectric elastomer materials. A plurality of layers of dielectric elastomers allows for creating complex shapes that conform to allow better contact and/or increase the surface area of contact of the electrode with the tissue. The number of layers will depend on the location of the electrodes around areas of the face where there are higher variabilities between users (e.g. cheekbones, eyebrows, etc.).

Figure 6A:
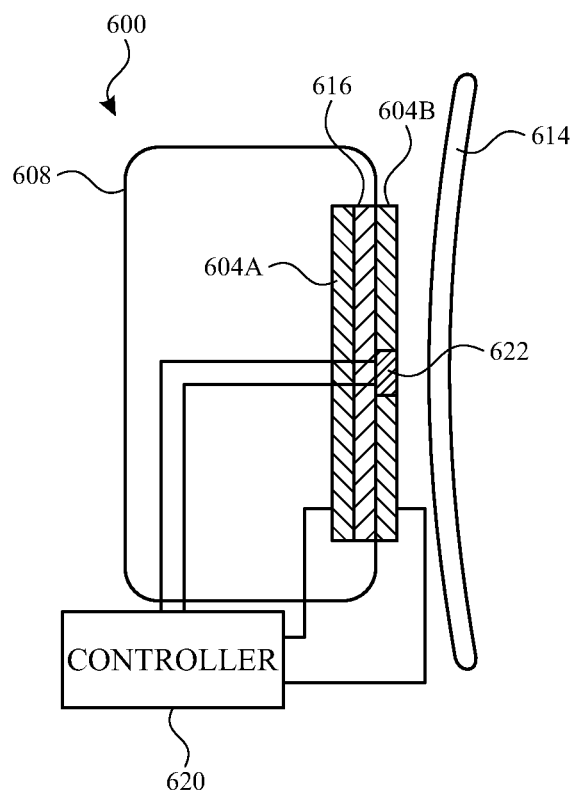
FIG. 6A illustrates an example electrode configuration including one or more elements in an inactive state, but which can be activated to improve coupling between the electrodes and tissue, and additionally a pressure sensor co-located with the electrodes according to examples of the disclosure.

FIG. 6A illustrates an example electrode configuration including one or more elements in an inactive state, but which can be activated to improve coupling between the electrodes 604 and tissue 614, and additionally a pressure sensor 622 co-located with the electrodes according to examples of the disclosure. FIG. 6A is similar to FIGS. 5A and 5B, except for the addition of pressure sensor 622 and associated electronics. In some embodiments, each electrode pair of device 600 can be coupled to one or more respective pressure sensors 622. Pressure sensors 622 can be coupled to the surface and/or integrated into electrodes 604A and/or 604B, and can furnish controller 620 with signals and/or data associated with the force applied to tissue 614 by the electrodes. In some embodiments, each electrode of device 600 can be coupled to one or more respective pressure sensors (e.g., one electrode or a grid of electrodes). Wearable devices such as head mounted devices including one or more pressure sensors can therefore moderate the pressure exerted by electrodes 604 and balance the need to establish and maintain contact between the electrodes and tissue 614, on the one hand, with the comfort of the user on the other hand.

Figure 6B:
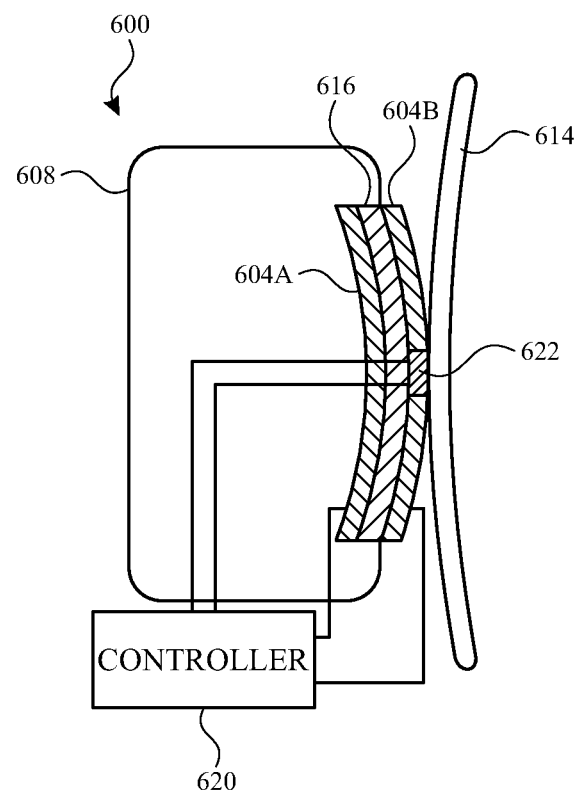
FIG. 6B illustrates the example electrode and pressure sensor configuration of FIG. 6A in an activated state to improve coupling between the electrodes and tissue according to examples of the disclosure.

FIG. 6B illustrates the example electrode and pressure sensor configuration of FIG. 6A in an activated state to improve coupling between the electrodes 604 and tissue 614 according to examples of the disclosure. In the example of FIG. 6B, circuitry (e.g., a source) within controller 620 applies a voltage or current across first electrode 604A and second electrode 604B. In response to the application of voltage and/or current, an electric field is created between first electrode 604A and second electrode 604B. In response to this applied electric field, the resulting electrostatic pressure and mechanical compression causes the elastomer 616 located between the first electrode 604A and the second electrode 604B to undergo a deformation (as compared to FIG. 6A, which is prior to deformation), wherein the elastomer contracts in thickness and expands in area. Because the first electrode 604A and the second electrode 604B are coupled to elastomer 616, the increase in surface area of the elastomer causes the electrodes to warp or "buckle" and protrude from device housing 608. The electrodes 604 and/or the elastomer 616 make contact with tissue 614, which can correspond to the tissues of a user such as the epidermis.

Because pressure sensor 622 is co-located with electrodes 604, when the electrodes make contact with tissue 614, the pressure sensor can detect the pressure applied by the electrodes against the tissue. Device 600 can include control circuitry within controller 620 that is coupled to pressure sensor 622 to capture and process pressure readings from the pressure sensor. In some examples, pressure sensor 622 may be selectively monitored rather than continuously monitored. For example, nose/ear electrodes can detect the presence of brain signals or other signals indicative of user activity (e.g., by detecting EEG and/or EOG signals). Upon detecting user activity, other electrodes (e.g., around the eye area) can be activated, and pressure sensor circuitry can also be activated. When pressure sensing is activated, pressure sensor 622 can furnish controller 620 with signals and/or data associated with the force applied to tissue 614 by the electrodes 604. In some embodiments, each electrode of device 600 can be coupled to one or more respective pressure sensors (e.g., one electrode or a grid of electrodes).

Figure 6C:
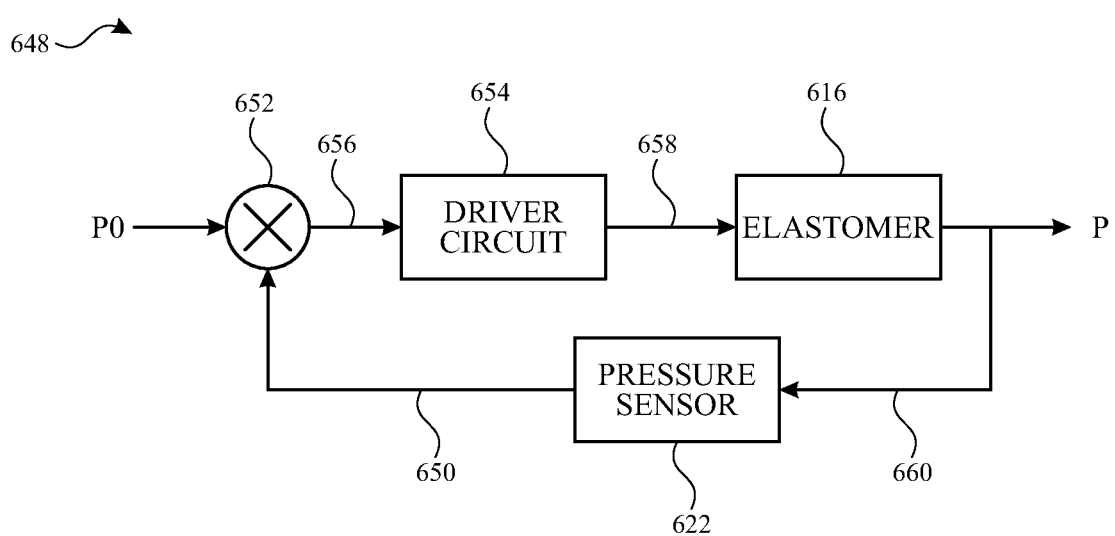
FIG. 6C illustrates a feedback control system for regulating the amount of pressure that electrodes apply to tissue according to some examples of the disclosure.

FIG. 6C illustrates a feedback control system 648 for regulating the amount of pressure that electrodes 604 apply to tissue 614 according to some examples of the disclosure. Feedback control system 648 can ensure that electrodes 604 apply sufficient pressure to tissue 614 to obtain accurate electrode signals, while maintaining relative limits of applied pressure to ensure that a user is not subject to an excess amount of mechanical force while the device attempts to optimize contact. In some embodiments, relevant pressure sensor data can be used as part of a closed loop feedback control system 648 associated with device 600. Feedback control system 648 can include pressure sensor(s) 622, comparator 652, driver circuit 654, and elastomer 616. In the embodiment of FIG. 6B, actual pressure 660, applied between electrodes 604 and tissue 614, can be detected by pressure sensor(s) 622. Pressure signals 650 from pressure sensor 622 can be fed back to comparator 652, which can determine the difference between a desired pressure P0 and actual pressure 660 and generate a difference signal 656. Desired pressure P0 can be a predetermined pressure level that is expected to provide electrode signal quality sufficient for accurate eye gaze determination. Difference signal 656 can be fed into driver circuit 654, which can generate voltage signals 658 to electrodes 604, which in turn can cause a change in the deformation of elastomer 616 and a change in actual pressure 660. If difference signal 656 indicates that actual pressure 660 is less than the desired pressure P0, driver circuit 654 can modify voltages 658 applied to electrodes 604 to further bend or deform elastomer 616 and increase the actual pressure 660. After one or more iterations, feedback control system 648 can increase the actual pressure 660 until it reaches an achieved pressure P that is approximately equal to the desired pressure P0. However, if difference signal 656 indicates that actual pressure 660 is greater than the desired pressure P0, driver circuit 654 can modify voltages 658 applied to electrodes 604 to decrease the bend or deformation of elastomer 616 and reduce the actual pressure 660 until it reaches the desired pressure P0. Feedback control system 648 can also ensure that actual pressure 660 is not great enough to subject the user to an excess amount of mechanical force while the device attempts to optimize contact. In some embodiments, control algorithms associated with the closed loop feedback system can be run locally. Additionally or alternatively, control algorithms can be run partially or entirely by a device communicatively coupled to device 600 (e.g., using a wireless communication channel). Additionally or alternatively, pressure data can be monitored in conjunction with and/or instead of other characteristics relevant for EOG sensing, including, but not limited to, the impedance of one or more portions of sensing circuitry, the signal to noise ratio of received signals, and data associated with motion of the device and/or its constituent components.

For example, instead of pressure sensor(s) 622, the impedance of the contact between the electrodes 604 and skin/tissue 614 can be estimated, and the current applied to dielectric polymer 616 (e.g., a current signal) can be changed, as needed, until a sufficient impedance is achieved. Impedance measurements can be obtained via circuitry also used to interface with electrodes. For example, device 600 can comprise one or more current sources configured to supply current to the body of a user. The voltage and current measured via electrodes 604 can be used to calculate an impedance associated with sensing EOG signals. Specifically, the impedance can be indicative of the quality of contact between the tissue 614 and electrodes 604.

When sufficient electrode contact is made with user tissue to generate accurate electrode signals, electrode data can be collected and processed to perform gaze detection and eye tracking. Gaze detection and eye tracking can be utilized as user inputs to trigger various functions. Additionally or alternatively, other triggers to transition between operating modes can be implemented. For example, the trigger can involve an ocular event comprising detection of the gaze of a user. Specifically, the ocular event can comprise fixating on a pre-determined area including, but not limited to, the corners of the user's field of view, referred to herein as a "hot corner." The hot corner can also be configured based on the absolute and/or relative dimensions of the device. To accommodate variance in the physical features of potential users, for example, the hot corner can correspond to detecting gaze fixation at a position on or in a lens (e.g., corresponding to a corner of lens 306 of FIG. 3). Additionally or alternatively, the hot corners can be determined in part or entirely based on a determination of the relative angle of the user's eye. In some embodiments, a first ocular event (e.g., gazing towards a hot corner) can be detected at a first resolution, and after detecting the ocular event (e.g., after a threshold amount of time), one or more further ocular events can be detected at a higher resolution. This embodiment can allow the system to capture broad, general ocular events, and in response to some condition (e.g., a threshold amount of time, a sequence of one or more fixations on one or more locations, and/or detecting one or more blinks), capture finer and more accurate changes associated with one or more ocular events.

In some embodiments, a plurality of electrodes can be configured to detect EOG signals, the signals associated with movement of the eye that can be mapped to a defined coordinate system. In some embodiments, electrodes can be configured to create a two-dimensional coordinate map to interpret eye movement. In some examples, the two-dimensional coordinate map can relate to rotation of the eye (e.g., towards the coronal plane bisecting the head of a user). For example, the eyes of a user staring straight ahead can correspond to an initial position, such as a vector extending orthogonally (e.g., in the Z direction) to an imaginary coronal plane (e.g., an X-Y two-dimensional plane) bisecting the user's head. In some embodiments, the electrodes can provide a linear, or nearly linear, relationship between rotation of the eye (e.g., vertical and horizontal rotation, or a combination thereof) and the voltage output by the electrodes. Accordingly, an exemplary device can detect one or more voltages from the electrodes and compute a perceived rotation of the eye into processed signals (e.g., signals indicative of vertical and horizontal rotation, or a combination thereof). In some embodiments, the rotation of the eye away from the initial position can be calculated using the one or more processed signals and a vector can be calculated corresponding to eye movement. In some examples, the vector can be projected onto the imaginary coronal plane to better correlate vertical and/or horizontal movement of the eye to vertical and/or horizontal navigation of a user interface.

An example use case of the above described behavior can be unlocking the device 600 of a user in response to an ocular event. Unlocking the device 600 can include providing user access to one or more functions and/or operating modes of the device. For example, device 600 can be maintained in a low-power mode, even when mounted on the head of a user, until after the ocular event is detected.

In response to detecting that the device 600 is being worn by the user, the device can optionally activate functions of one or more components to improve detection of an ocular event, but the device state can appear mostly or completely unchanged from the perspective of the user. In this operating mode, device functionality can be partially enabled. After optionally entering the more fully enabled mode, the user can optionally be prompted to direct their gaze towards a position. The user gaze and/or movement can, in some embodiments, correspond to an ocular event comprising movement of the eyes from a first direction to a second direction (e.g., movement of the eyes from a left portion of the screen to a right portion of the screen). It is understood that the ocular event described is not limiting and could correspond to any suitable movement, including, but not limited to, linear—or mostly linear—movement of the eyes (e.g., vertically, horizontally, diagonally) or movement of the eyes in a curved and/or irregular path.

In some embodiments, device 600 can be configured to detect ocular events using a minimal amount of electrodes (e.g., two electrodes). For example, device 600 can comprise two electrodes configured to detect one or more ocular events. In some embodiments, as few as two electrodes can be implemented to detect wake-up conditions. The wake-up conditions described herein can be combined in multiple combinations. As described herein, the wake-up conditions can include detecting EOG and/or EEG signals corresponding to the user placing device 600 on their head. The wake-up conditions can also additionally or alternatively include detecting directional eye movement, such as unidirectional eye movement. In some embodiments, wake-up conditions can include an ocular event associated with fixation of user gaze on a hot corner. For example, a device comprising at least three electrodes can be configured to detect ocular events corresponding to fixations at particular angles of the eye, thus providing EOG sensor data to device 600 that can optionally be used as a wake-up condition.

Figure 7:
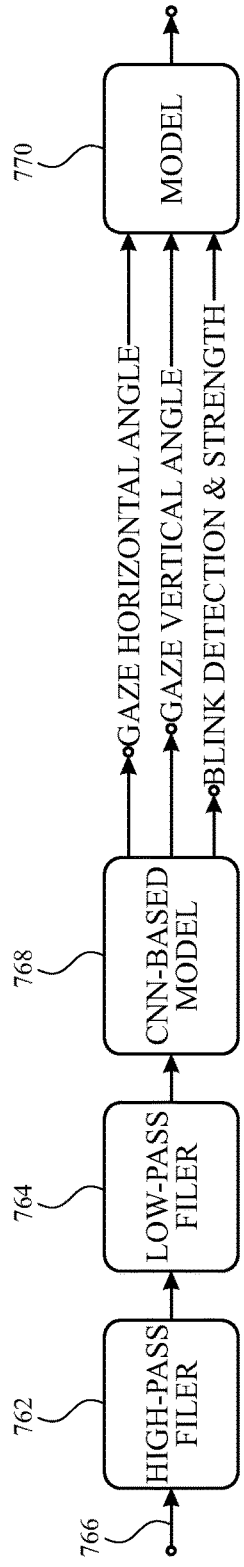
FIG. 7 illustrates exemplary signal processing of electrode signals according to some embodiments of the disclosure.

FIG. 7 illustrates exemplary signal processing of electrode signals according to some embodiments of the disclosure. In some embodiments, electrode signals 766 can correspond direct measurements of electrodes. The voltages corresponding to the electrode signals 766 can be further processed by the head mounted device, such as in AFE 224 of device 202 of FIG. 2, and/or by an associated computing system that can optionally be a separate device, such as in device 204 of FIG. 2. For example, signals can pass through one or more filters. In some embodiments, the filters can include one or more high-pass filters 762, one or more bandpass filters (not shown), and/or one or more low-pass filters 764. The filters can be configured to attenuate noise, mitigate signal drift, prevent aliasing, etc. One or more machine learning algorithms can additionally or alternatively be configured to process the received electrode signals 766. For example, a convolutional neural network (CNN) based model 768 can be applied to data corresponding to signals 766 to improve characterizations of the horizontal and/or visual angles, blink events, and/or gaze fixation and generate an updated model 770. The device and/or the associated computing system can be configured to invoke functions, methods, and/or processes associated with the device and/or system including transitioning between operating modes, activating voice-recognition software, etc.

Figure 8:
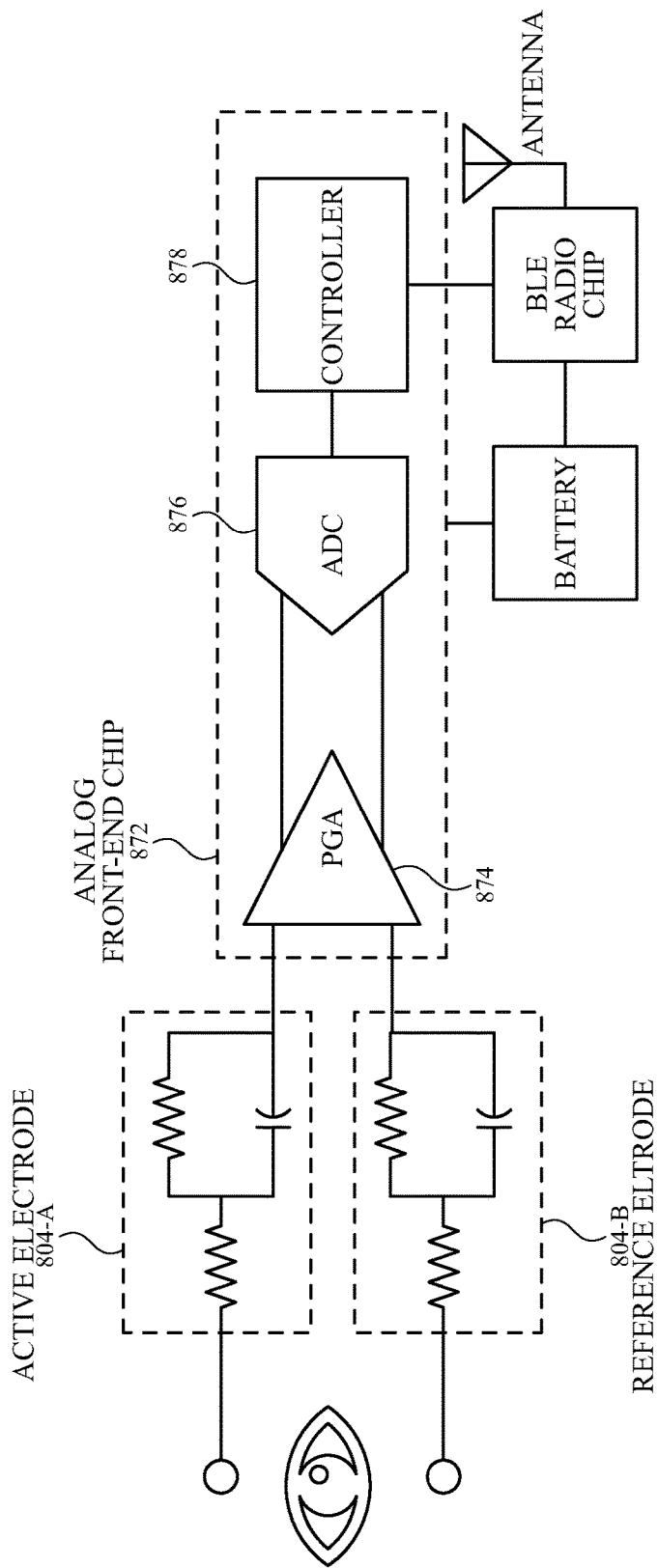
FIG. 8 illustrates exemplary electrodes and an analog front end for processing of electrode signals according to some embodiments of the disclosure.

FIG. 8 illustrates exemplary electrodes 804 and analog front end 872 for processing of electrode signals according to some embodiments of the disclosure. Active electrode 804-A and reference electrode 804-B can be modeled with the example circuit elements shown in FIG. 8. In some examples, these electrodes 804 can have a signal amplitude of 50 uV to 3.5 mV, frequency content of 0-40 Hz, and an electrode DC offset of up to +/−1 V (which can depend on electrode material and skin contact). In some embodiments, a device can include front-end circuitry 872 to condition and sample signals from these electrodes. For example, the device circuitry can include one or more amplifiers 874 (e.g., programmable gain amplifiers). The inputs of a respective amplifier can be tied to an active electrode and to a reference electrode as shown in FIG. 8 to obtain a differential voltage at the amplifier output, the output corresponding to the relative voltage difference detected by the active electrode and associated with ocular events. The output of the amplifier 874 can further be coupled to one or more variable analog-to-digital converters (ADCs) 876 that can be configurable to quantize signals at one or more resolutions. A controller 878 can be coupled to the one or more ADCs 876 to receive and/or process the digitized signals.

In some embodiments, the analog front-end 872 can include one or more elements to measure impedance. For example, the analog front-end can include one or more current sources configured to stimulate the tissue of a user. Voltages measured (e.g., by the one or more electrodes of the device) in response can then be used in conjunction with the known current to calculate impedance. In some embodiments, the measured impedance can be used by a controller included in the device to configure one or more dielectric elastomers (e.g., to increase and/or decrease pressure between one or more electrodes and tissues of a user). The increased pressure will help achieve a better signal quality by reducing the electrode-skin impedance up to a point that it does not compromise user comfort.

The analog front-end circuitry can in some embodiments be configured with particular specifications in mind. For example, the signals received by the one or more amplifiers can span a range including, but not limited to, 50 µV-3.5 mV comprising frequency content including, but not limited to, 0-40 Hz. Additionally or alternatively, the common-mode input range of the amplifiers can include +/−1V, and the input impedance can exceed 1GΩ.

Figure 9:
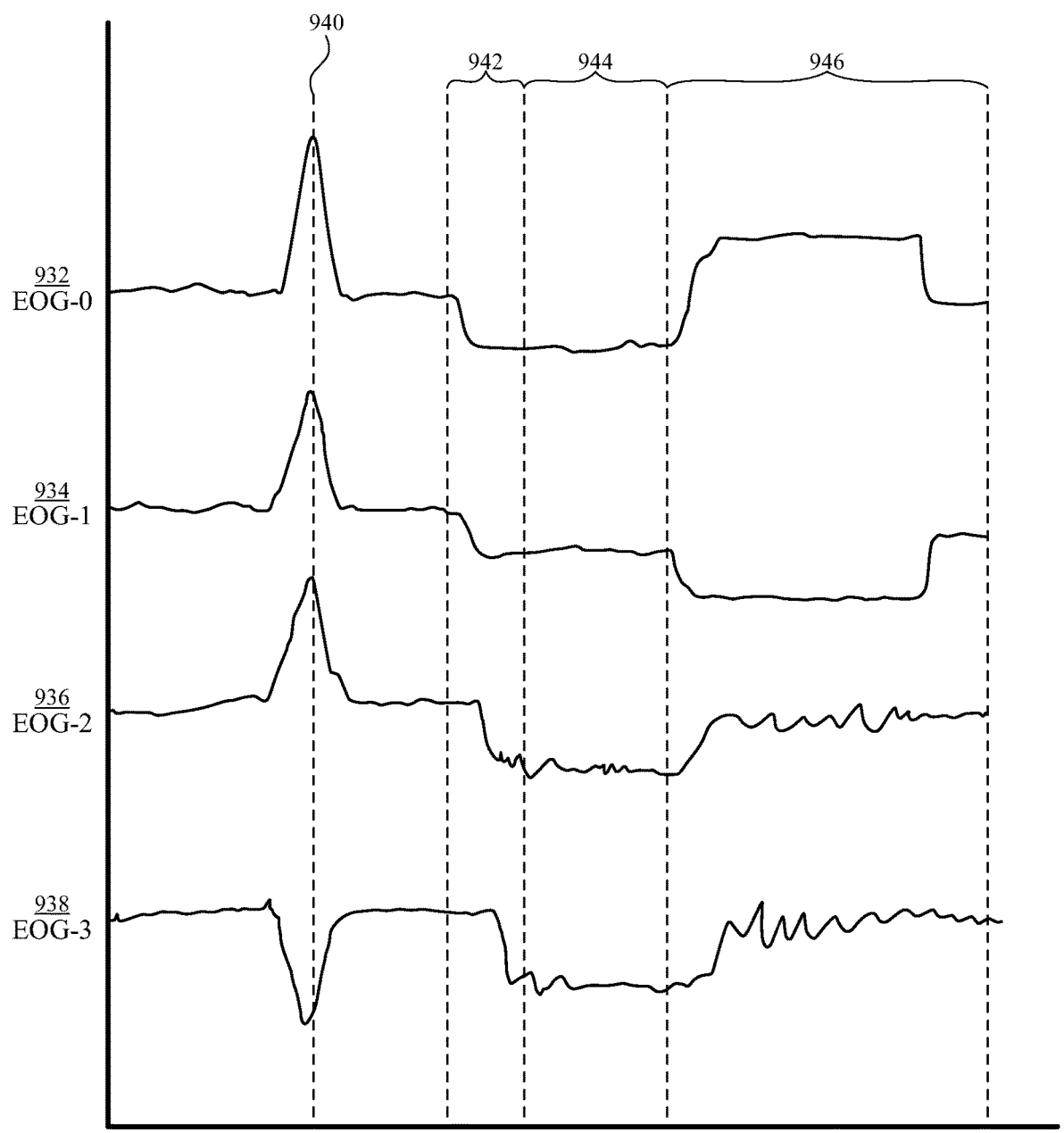
FIG. 9 shows examples of sensor data associated with a head-mounted device according to some examples of the disclosure.

FIG. 9 shows examples of EOG sensor data associated with a head-mounted device according to some examples of the disclosure. In some embodiments, a device can comprise a plurality of electrodes configured to detect movement of the eyes. In some embodiments, the electrodes can be arranged to capture EOG signals. As described herein, the electrode configuration is not limited in any way provided that the signals captured by the electrodes are associated with ocular events. For example, the EOG signals output by the electrodes can correspond to a blink of a user. Additionally or alternatively, the strength of the blink can be sensed and detected by the head-mounted device. In some embodiments, one or more electrodes can be arranged to make contact with tissues superior and/or inferior to the eyes of a user. Additionally or alternatively, one or more electrodes can be arranged to make contact with tissues lateral and/or medial to the eyes. In some embodiments, the electrodes can be arranged to make contact with the bridge of the user's nose (e.g., corresponding to electrodes 304*b* and/or 304*c* of FIG. 3), with the forehead of the user (e.g., corresponding to electrode 304*a*), and/or with areas around and behind the user's ears (e.g., corresponding to 304*d* and 304*k*).

In some embodiments, an electrode in contact with the user's forehead can be configured as a reference voltage to calculate a plurality of differential voltages indicative of eye gaze and/or movement. For example, signal 932 and signal 934 can correspond to differential voltages between the reference electrode on the user's forehead (e.g., corresponding to electrode 304*a*) and electrodes on the right and the left of the user's nose bridge (e.g., corresponding to electrodes 304*b* and 304*c*). Signal 936 and signal 938 can correspond to differential voltages between the reference electrode and electrodes behind/around the right and the left ear of the user (e.g., corresponding to electrodes 304*d* and 304*k*).

In some embodiments, the signals shown in FIG. 9 can correspond to several ocular events. For example, signals 932, 934, 936 and 938 during time period 940 can correspond to the blink of a user. As described previously, the strength of the blink can also be detected. Blinks can be used to perform functions of the device, such as confirming and/or selecting an element of a user interface associated with the head-mounted device. EOG signals provided by the electrodes can, in some embodiments, correspond to rotation of the eye in one or more directions. For example, events associated with movement of the eyes can correspond to horizontal and/or vertical angles of gaze and can be detected during time period 942. During time period 942, signals 932, 934, 936 and 938 exhibit a downward slope, which can correspond to a change in the visual angle of the eyes including the user gaze shifting upwards. In some embodiments, the EOG signals can also capture the state of the user gaze. Time period 944 can correspond to the user maintaining a particular visual angle (e.g., the visual angle established during time period 942). Subsequent changes to visual angles can additionally be detected as shown during time period 946, which can correspond to the user gaze shifting to the right. In some embodiments, the plateaus, or near plateaus, of signals 932, 934, 936 and 938 can raise and/or lower as the visual angle of the user gaze changes. Similarly, in some embodiments, the magnitude of the signals 932, 934, 936 and 938 can vary for each user and as the strength of events vary (e.g., based on the strength of a blink).

Figure 10:
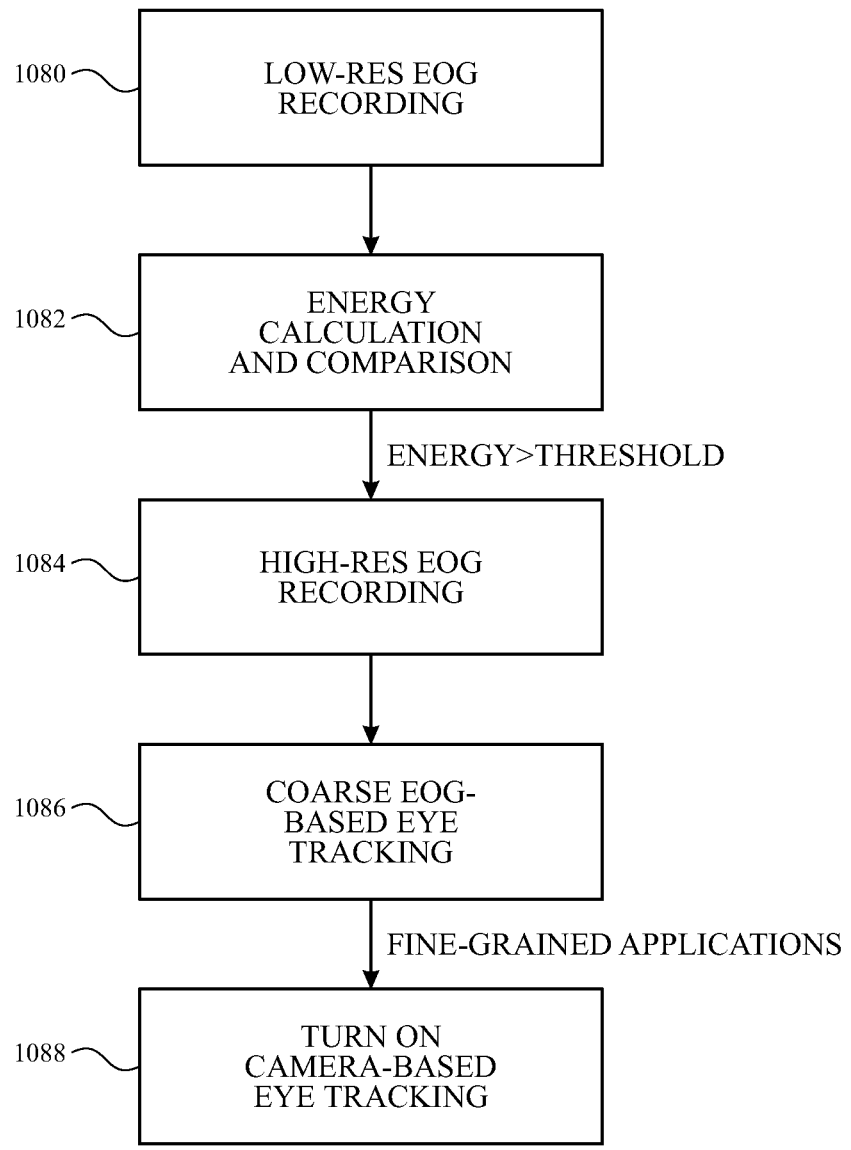
FIG. 10 illustrates a method of reduced power consumption eye tracking according to some examples of the disclosure.

FIG. 10 illustrates a method of reduced power consumption eye tracking according to some examples of the disclosure. Device power consumption can be particularly critical when integrated power sources are limited, such as in wearable devices comprising finite power sources (e.g., batteries). Moreover, heat generated during operation of electronics can add to discomfort of wearable devices; therefore, reducing power consumed by the device can be a key device and/or system design consideration. In some embodiments, signals captured by electrodes having sufficient contact can be captured and configured to vary operating modes of the device. As described above, the electrodes can be arranged and configured to make contact between one or more of the temples, nose, cheeks, eyebrows, behind the ears, etc. In some embodiments, a subset of the electrodes of the device (e.g., electrodes in contact with the nose and/or one or more ears of the user) can be configured to capture signals corresponding to brain activity of the user. For example, electrical impulses corresponding to movement of the eyes and/or muscles within the user's face can be detected. Additionally or alternatively, the brain activity associated with the movement of the eyes and/or muscles can be detected. In some embodiments, until the brain activity is sensed (e.g., EEG signals are detected), the device can operate in a low power mode as shown in block 1080. The low power mode can comprise turning off some or all of components and/or circuitry within and/or associated with the head mounted device. In some embodiments, some or all of the components and/or circuitry can be configured in a sleep mode (e.g., low power consumption). In some embodiments, the low power mode can comprise configuring some or all of the components and/or circuitry associated with the head-mounted device to operate poll registers, communication channels, or other computing and sensing circuitry at a lower rate and/or resolution. In some embodiments, the device can operate in a low power mode until other electrical activity related to one or more ocular events is detected, and the detected electrical activity can be quantified into an energy level (e.g., by integrating electrical activity over time) as shown in block 1082. While operating in the low power mode, power can be conserved until receiving a trigger (e.g., detecting brain activity and/or ocular events), thus optimizing the lifespan of the device, and minimizing superfluous calculations, computations, and/or measurements aside from those associated with detecting the trigger. In some embodiments, the calculated energy level can be compared against a threshold energy level as shown in block 1082. If the calculated energy level exceeds the threshold, this can trigger the device to enter a higher power mode.

After detecting the trigger, the operating mode can transition from a lower to a higher power mode as shown in block 1084. For example, one or more analog-to-digital converters (ADCs) can be configured to transition from a first resolution at a lower power condition (block 1080) to a second resolution at a higher power condition (block 1084), the second resolution finer than the first. In some examples, the trigger can also be associated with enabling the stimulation, measurement, and/or configuration of one or more electrodes of the device. In some embodiments, in response to the trigger, one or more electrodes can transition from a sleeping (i.e., lower power) mode to a higher power mode at which the one or more electrodes can be sensed, polled, and/or detected. Additionally or alternatively, pressure sensors 622 coupled and/or embedded into the electrodes can similarly be configured in response to the trigger. In some embodiments coarse electrode-based eye tracking as shown in block 1086 can be utilized until finer resolution eye tracking is needed, which may depend on the function being performed by the eye tracking and/or the application or user interface being presented. In situations where finer resolution eye tracking is needed, camera-based eye tracking can be utilized, as shown in block 1088.

Therefore, according to the above, some examples of the disclosure are directed to a device for detecting eye movement, comprising sensing circuitry configured to sense a physiological signal, the sensing circuitry including a plurality of electrodes, and one or more elastomer materials coupled to a respective pair of electrodes of the plurality of electrodes, wherein the respective pair of electrodes are configured for receiving a signal associated with altering a shape of the one or more elastomer materials and the respective pair of electrodes to improve contact between at least one of the respective pair of electrodes and tissue of a user. Alternatively or additionally to one or more of the examples above, in some examples the one or more elastomer materials comprise dielectric elastomer materials. Alternatively or additionally to one or more of the examples above, in some examples the device further comprises one or more pressure sensors coupled to at least one electrode in the respective pair of electrodes, and control circuitry coupled to the one or more pressure sensors and the sensing circuitry. Alternatively or additionally to one or more of the examples above, in some examples the signal associated with altering the shape of the one or more elastomer materials is modified based on a first criteria. Alternatively or additionally to one or more of the examples above, in some examples the first criteria comprises meeting a threshold signal-to-noise ratio associated with the physiological signal. Alternatively or additionally to one or more of the examples above, in some examples the first criteria comprises meeting a threshold amount of force detected by the one or more pressure sensors. Alternatively or additionally to one or more of the examples above, in some examples the signal associated with altering the shape of the one or more elastomer materials is modified based on an impedance associated with the physiological signal. Alternatively or additionally to one or more of the examples above, in some examples the device further comprises one or more current sources configured to supply a current to the respective pair of electrodes via the tissues of a user of the device. Alternatively or additionally to one or more of the examples above, in some examples the physiological signal is a differential signal between two respective pairs of electrodes of the plurality of electrodes, wherein a first respective electrode pair of the plurality of electrodes is configured as a reference electrode, and a second respective electrode pair of the plurality of electrodes is configured as an active electrode. Alternatively or additionally to one or more of the examples above, in some examples the device further comprises circuitry configured to detect noise affecting the device, and a third respective electrode of the plurality of electrodes configured to supply a stimulus signal to a user of the device, wherein the stimulus signal is associated with reducing the detected noise. Alternatively or additionally to one or more of the examples above, in some examples the device further comprises one or more amplifiers coupled to the respective pair of electrodes, one or more analog-to-digital converters, wherein a resolution of a respective analog-to-digital converter of the one or more analog-to-digital converters is variable, and communication circuitry communicatively coupled to the processing circuitry and configured to transmit data associated with the physiological signal. Alternatively or additionally to one or more of the examples above, in some examples the physiological signal is associated with one or more ocular events. Alternatively or additionally to one or more of the examples above, in some examples the plurality of electrodes include one or more electrooculography (EOG) sensors.

Some examples of the disclosure are directed to a method for detecting eye movement, comprising coupling one or more elastomer materials to a respective pair of electrodes of a plurality of pairs of electrodes, contacting the respective pair of electrodes and the one or more elastomer materials with tissue associated with an eye of a user, receiving a signal at the respective pair of electrodes, altering a shape of the one or more elastomer materials and the coupled respective pair of electrodes based on the received signal to improve contact between the respective pair of electrodes and the tissue of the user, and sensing the physiological signal from the respective pair of electrodes, the physiological signal associated with the eye moment. Alternatively or additionally to one or more of the examples above, in some examples the one or more elastomer materials comprise dielectric elastomer materials. Alternatively or additionally to one or more of the examples above, in some examples the method further comprises altering the shape of the one or more elastomer materials and the coupled respective pair of electrodes based on first criteria. Alternatively or additionally to one or more of the examples above, in some examples the first criteria includes an amount of force applied by the respective pair of electrodes to the tissue of the user. Alternatively or additionally to one or more of the examples above, in some examples the first criteria includes a threshold signal-to-noise ratio associated with the physiological signal. Alternatively or additionally to one or more of the examples above, in some examples the first criteria includes a threshold impedance associated with the physiological signal. Alternatively or additionally to one or more of the examples above, in some examples the respective pair of electrodes includes one or more electrooculography (EOG) sensors.

Some examples of the disclosure are directed to a device for detecting eye movement, comprising sensing circuitry configured to sense a physiological signal from a plurality of electrodes, the physiological signal associated with the eye movement, and a processor communicatively coupled to the sensing circuitry and programmed for, in accordance with the physiological signal meeting a first criteria indicative of a first level of eye movement, operating the sensing circuitry in a first power level mode of operation, and in accordance with the physiological signal meeting a second criteria indicative of a second level of eye movement, operating the sensing circuitry in a second power level mode of operation, the second mode different than the first. Alternatively or additionally to one or more of the examples disclosed above, in some examples the first power mode comprises operating the one-or-more analog-to-digital converters at a first resolution, and the second power mode comprises operating the one or more analog-to-digital converters at a second resolution, the second resolution higher than the first. Alternatively or additionally to one or more of the examples disclosed above, in some examples the first criteria comprises comparing an energy level of the physiological signal against a threshold amount of energy. Alternatively or additionally to one or more of the examples disclosed above, in some examples the first criteria is associated with a blink. Alternatively or additionally to one or more of the examples disclosed above, in some examples the first criteria is associated with a fixation of gaze. Alternatively or additionally to one or more of the examples disclosed above, in some examples the first criteria includes a determination, via the sensing circuitry, that a user of the device is wearing the device. Alternatively or additionally to one or more of the examples disclosed above, in some examples the physiological signal comprises an electrooculography (EOG) signal. Alternatively or additionally to one or more of the examples disclosed above, in some examples the processor is further programmed for, while operating the sensing circuitry in the second power level mode of operation, in accordance with the physiological signal meeting a third criteria, operating the sensing circuitry and the processing circuitry in a third mode of operation, the third mode different than the first mode and the second mode. Alternatively or additionally to one or more of the examples disclosed above, in some examples the device further comprises one or more cameras configured to detect ocular events, and operating in the third mode of operation further comprises using the one or more cameras to collect information associated with the physiological signal.

Some examples of the disclosure are directed to a method for detecting eye movement, comprising sensing a physiological signal from a plurality of electrodes, the physiological signal associated with the eye moment, in accordance with the physiological signal meeting a first criteria indicative of a first level of eye movement, operating the sensing circuitry in a first power level mode of operation, and in accordance with the physiological signal meeting a second criteria indicative of a second level of eye movement, operating the sensing circuitry in a second power level mode of operation, the second mode different than the first. Alternatively or additionally to one or more of the examples disclosed above, in some examples the first power mode comprises operating one-or-more analog-to-digital converters at a first resolution, and the second power mode comprises operating the one or more analog-to-digital converters at a second resolution, the second resolution higher than the first. Alternatively or additionally to one or more of the examples disclosed above, in some examples the first criteria comprises comparing an energy level of the physiological signal against a threshold amount of energy. Alternatively or additionally to one or more of the examples disclosed above, in some examples the first criteria is associated with a blink. Alternatively or additionally to one or more of the examples disclosed above, in some examples the first criteria is associated with a fixation of gaze. Alternatively or additionally to one or more of the examples disclosed above, in some examples the first criteria includes determining that a user of the device is wearing the device. Alternatively or additionally to one or more of the examples disclosed above, in some examples the physiological signal comprises an electrooculography (EOG) or an electroencephalography (EEG) signal. Alternatively or additionally to one or more of the examples disclosed above, in some examples the method further comprises, while operating the sensing circuitry in the second power level mode of operation, in accordance with the physiological signal meeting a third criteria, operating the sensing circuitry and the processing circuitry in a third mode of operation, the third mode different than the first mode and the second mode. Alternatively or additionally to one or more of the examples disclosed above, in some examples operating in the third mode of operation further comprises using one or more cameras to collect information associated with the physiological signal.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A device for detecting eye movement, comprising:
sensing circuitry configured to sense a physiological signal, the sensing circuitry including a plurality of electrodes; and
one or more elastomer materials coupled to a respective pair of electrodes of the plurality of electrodes;
wherein the respective pair of electrodes are configured for receiving a signal associated with altering a shape of the one or more elastomer materials and the respective pair of electrodes to improve contact between at least one of the respective pair of electrodes and tissue of a user of the device.

2. The device of claim 1, wherein the one or more elastomer materials comprise dielectric elastomer materials.

3. The device of claim 1, further comprising:
one or more pressure sensors coupled to at least one electrode in the respective pair of electrodes; and
control circuitry coupled to the one or more pressure sensors and the sensing circuitry.

4. The device of claim 3, wherein the signal associated with altering the shape of the one or more elastomer materials is modified based on a first criterion.

5. The device of claim 4, wherein the first criterion comprises meeting a threshold signal-to-noise ratio associated with the physiological signal.

6. The device of claim 4, wherein the first criterion comprises meeting a threshold amount of force detected by the one or more pressure sensors.

7. The device of claim 1, wherein the signal associated with altering the shape of the one or more elastomer materials is modified based on an impedance associated with the physiological signal.

8. The device of claim 7, further comprising one or more current sources configured to supply a current to the respective pair of electrodes via the tissue of the user of the device.

9. The device of claim 1, wherein the physiological signal is a differential signal between two respective pairs of electrodes of the plurality of electrodes, wherein:
a first respective electrode pair of the plurality of electrodes is configured as a reference electrode, and
a second respective electrode pair of the plurality of electrodes is configured as an active electrode.

10. The device of claim 9, further comprising:
circuitry configured to detect noise affecting the device; and
a third respective electrode of the plurality of electrodes configured to supply a stimulus signal to the user of the device, wherein the stimulus signal is associated with reducing the detected noise.

11. The device of claim 1, further comprising:
one or more amplifiers coupled to the respective pair of electrodes;
one or more analog-to-digital converters, wherein a resolution of a respective analog-to-digital converter of the one or more analog-to-digital converters is variable; and
communication circuitry communicatively coupled to processing circuitry and configured to transmit data associated with the physiological signal.

12. The device of claim 1, wherein the physiological signal is associated with one or more ocular events.

13. The device of claim 1, wherein the plurality of electrodes include one or more electrooculography (EOG) sensors.

14. A method for detecting eye movement, comprising:
coupling one or more elastomer materials to a respective pair of electrodes of a plurality of pairs of electrodes;
contacting the respective pair of electrodes and the one or more elastomer materials with tissue associated with an eye of a user;
receiving a signal at the respective pair of electrodes;
altering a shape of the one or more elastomer materials and the coupled respective pair of electrodes based on the received signal to improve contact between the respective pair of electrodes and the tissue of the user; and
sensing a physiological signal from the respective pair of electrodes, the physiological signal associated with the eye movement.

15. The method of claim 14, wherein the one or more elastomer materials comprise dielectric elastomer materials.

16. The method of claim 14, further comprising:
altering the shape of the one or more elastomer materials and the coupled respective pair of electrodes based on a first criterion.

17. The method of claim 16, wherein the first criterion includes an amount of force applied by the respective pair of electrodes to the tissue of the user.

18. The method of claim 16, wherein the first criterion includes a threshold signal-to-noise ratio associated with the physiological signal.

19. The method of claim 16, wherein the first criterion includes a threshold impedance associated with the physiological signal.

20. The method of claim 14, wherein the respective pair of electrodes includes one or more electrooculography (EOG) sensors.

* * * * *